United States Patent
Hensen et al.

(10) Patent No.: US 9,517,588 B2
(45) Date of Patent: Dec. 13, 2016

(54) CONNECTED SPOUTS OF CONTAINERS AND RELATED METHODS

(71) Applicant: Flex&Fill Solutions Limited, Brimscombe Stroud Gloucestershire (GB)

(72) Inventors: Henno Hensen, Bremen (DE); Adam Green, Brimscombe Stroud (GB)

(73) Assignee: Henno Hensen, Bremen (DE)

( * ) Notice: Subject to any disclaimer, the term of this patent is extended or adjusted under 35 U.S.C. 154(b) by 54 days.

(21) Appl. No.: 14/543,161

(22) Filed: Nov. 17, 2014

(65) Prior Publication Data

US 2016/0137357 A1  May 19, 2016

(51) Int. Cl.
| | |
|---|---|
| B65D 35/38 | (2006.01) |
| B29C 65/08 | (2006.01) |
| B29C 65/00 | (2006.01) |
| B65D 25/42 | (2006.01) |
| B65D 75/58 | (2006.01) |
| B29L 31/00 | (2006.01) |

(52) U.S. Cl.
CPC ............ B29C 65/08 (2013.01); B29C 65/002 (2013.01); B65D 25/42 (2013.01); B65D 75/5883 (2013.01); B29L 2031/712 (2013.01)

(58) Field of Classification Search
CPC . B65D 75/5883; B65D 25/42; B29L 2031/712
USPC ................. 222/567, 143, 94, 129; 206/820
See application file for complete search history.

(56) References Cited

U.S. PATENT DOCUMENTS

| | | | | |
|---|---|---|---|---|
| 4,512,475 A * | 4/1985 | Federighi | ............... | A61J 1/067 206/484 |
| 4,732,299 A * | 3/1988 | Hoyt | ...................... | B29C 65/02 222/107 |
| 4,951,822 A * | 8/1990 | Fontana | ................. | B65D 1/095 206/530 |
| 5,290,105 A * | 3/1994 | Tencati | ............. | B65D 75/5883 215/12.2 |
| 5,577,636 A * | 11/1996 | Fukuoka | .............. | B65D 1/0238 222/107 |
| 2004/0149774 A1* | 8/2004 | Strong | ................... | B65D 1/095 222/94 |
| 2005/0261659 A1* | 11/2005 | Mizuo | ...................... | A61J 1/10 604/410 |
| 2011/0132928 A1* | 6/2011 | Fontana | ................. | A61J 1/067 222/94 |
| 2015/0151891 A1* | 6/2015 | Shi | ........................ | B65D 1/095 222/94 |

* cited by examiner

*Primary Examiner* — Donnell Long
(74) *Attorney, Agent, or Firm* — Rankin, Hill & Clark LLP

(57) ABSTRACT

This invention relates to a specially adapted spouted closure that has oppositely positioned protruding tabular features that enable it to be heat welded or bonded to another closure of the same kind as shown in FIG. 15. The protruding tabs being so formed to enable a plurality of closures to form chains and to allow a degree of movement in an orthogonal direction to the orientation of the spout. The part of the rigid closure that attaches to the flexible part of the packaging being orientated in a way that allows adjacent containers to overlap with one another. The protruding tab of the rigid closure being formed in a position relative to rest of the closure to enable the closure to pass along a guide rail without snagging.

16 Claims, 9 Drawing Sheets

Figure 15:
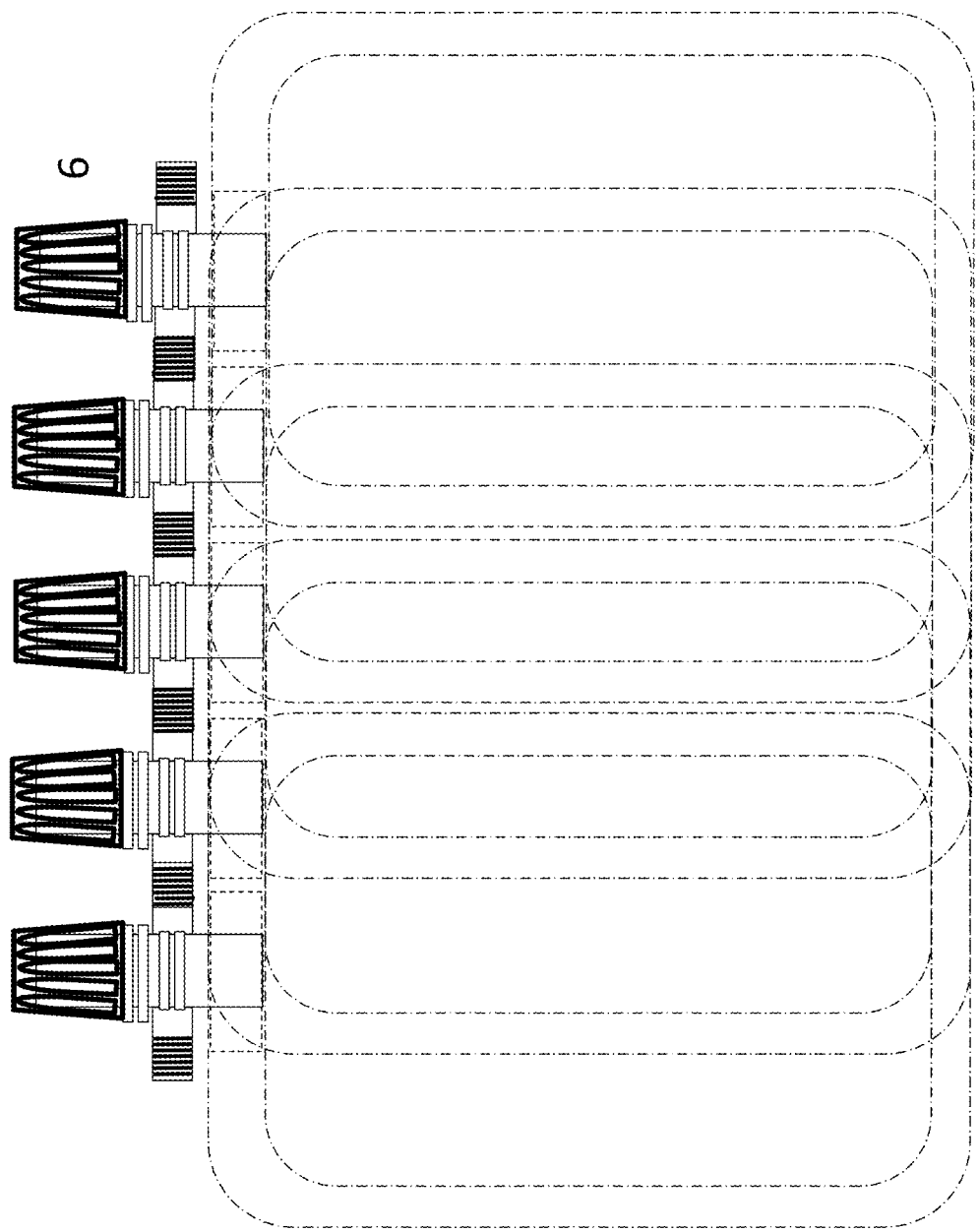

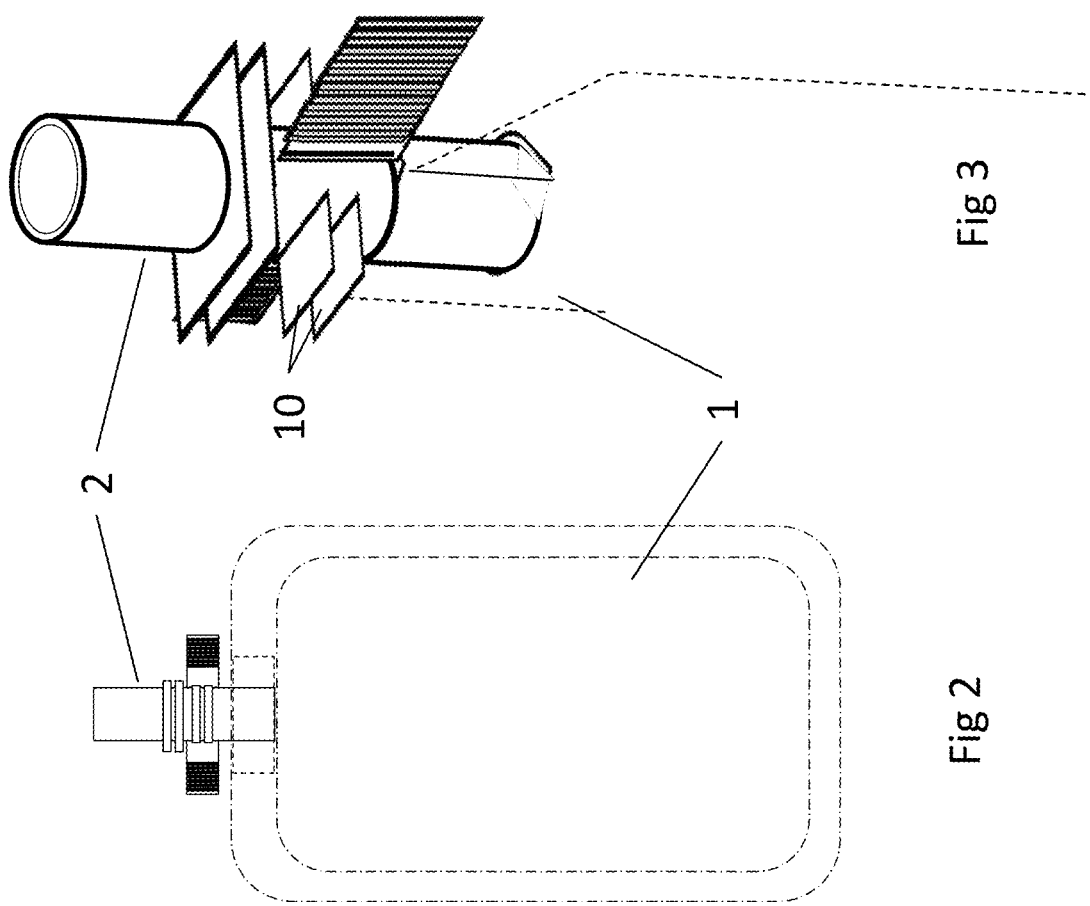
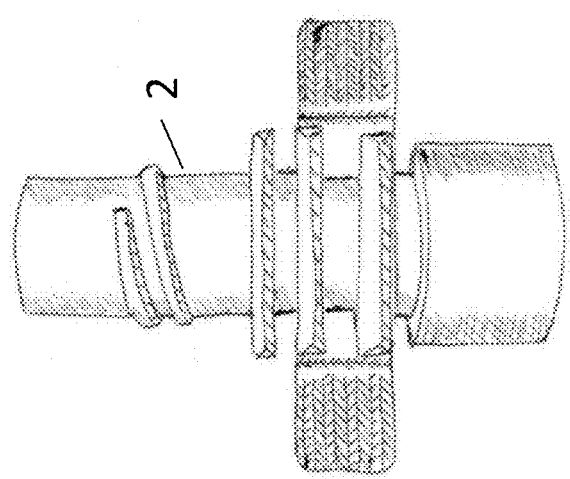
Fig 1
Fig 2
Fig 3

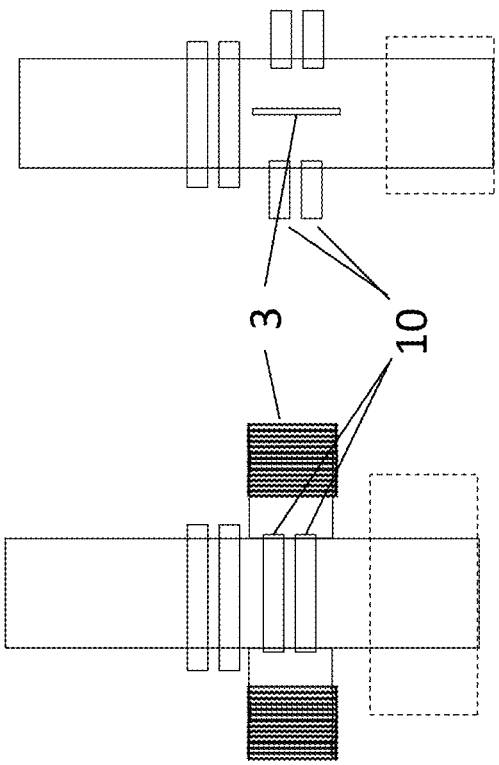
Fig 7
Fig 6
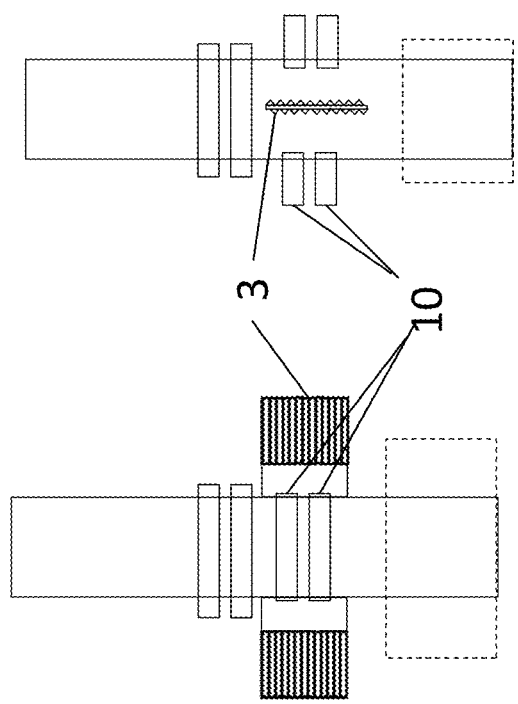
Fig 5
Fig 4

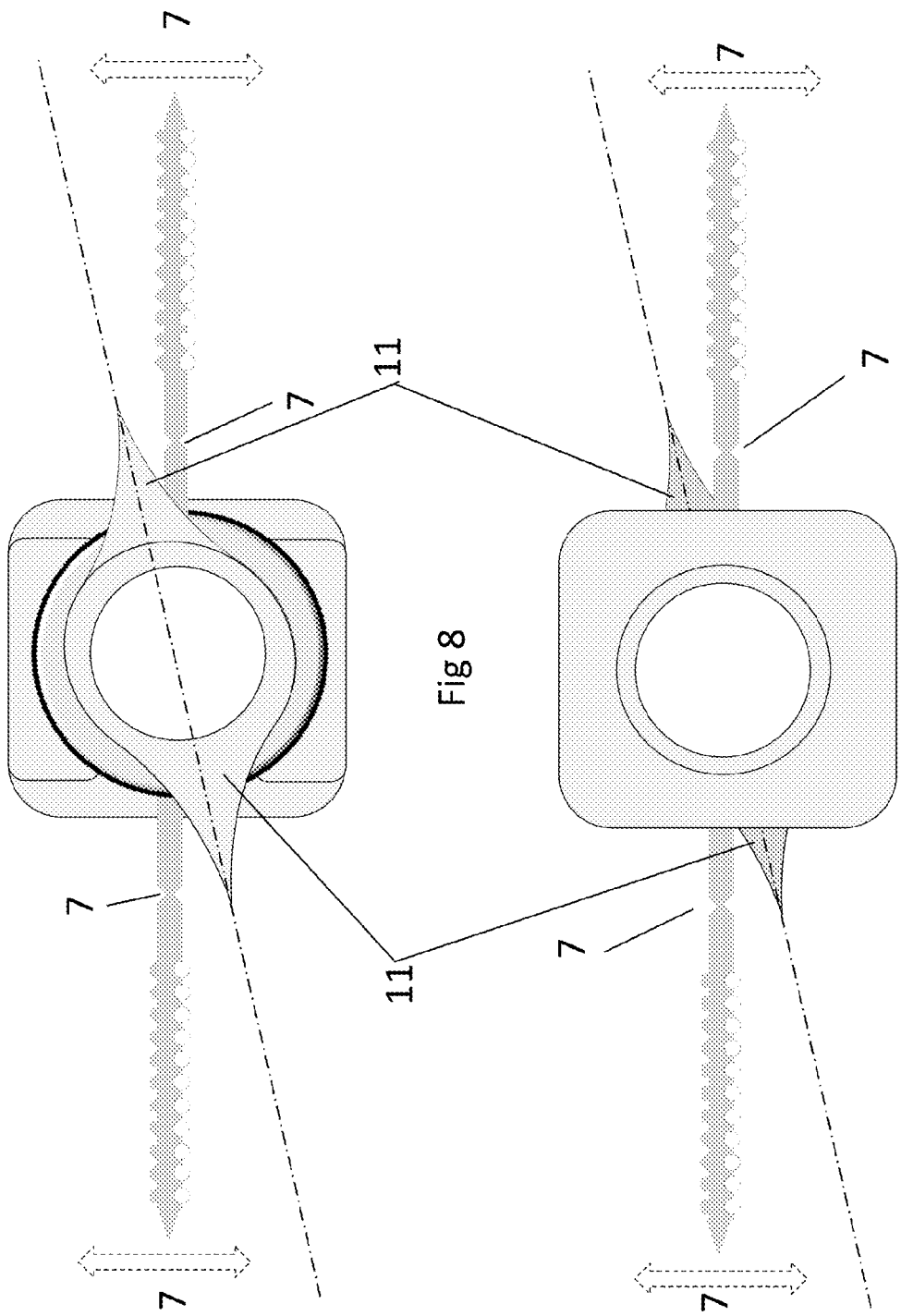

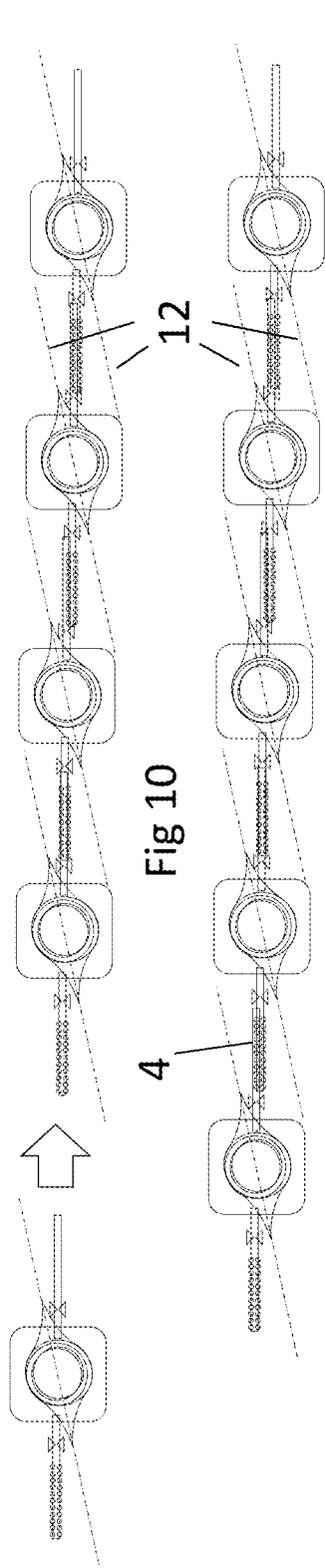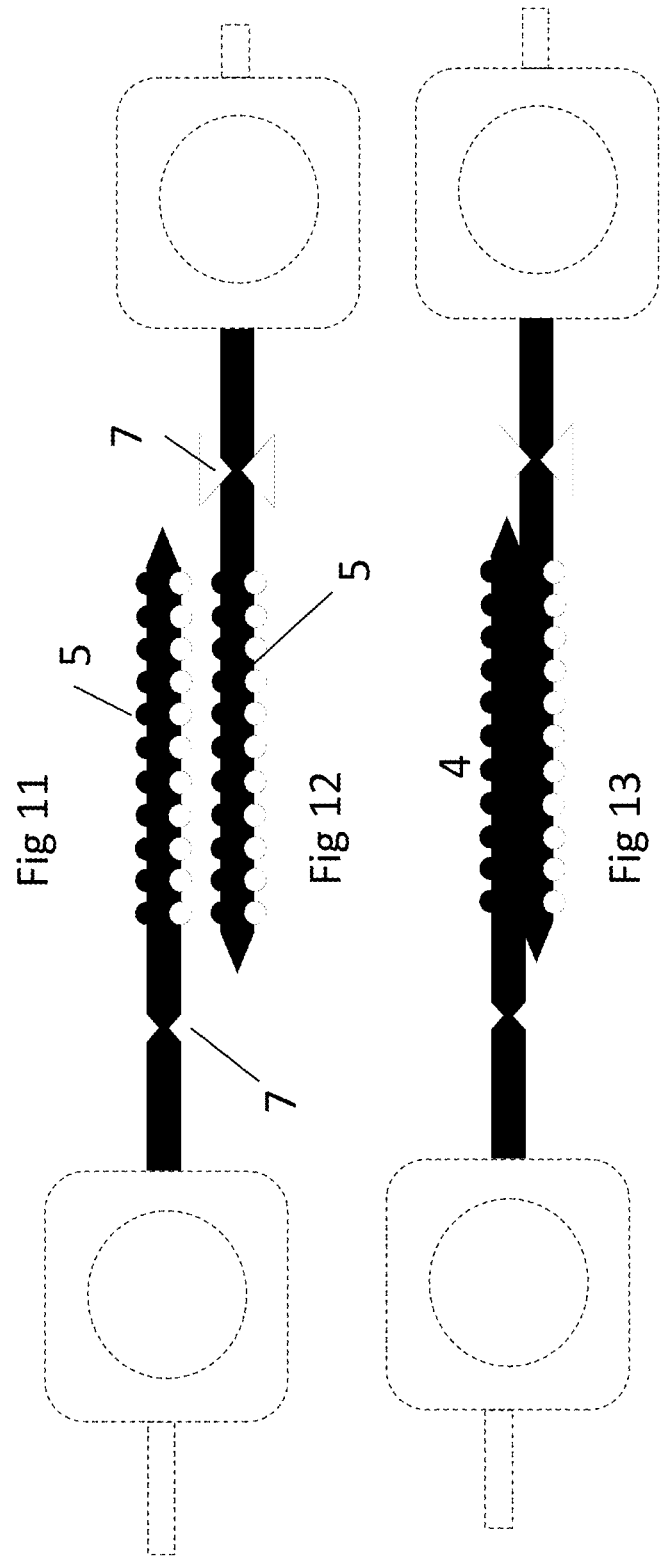

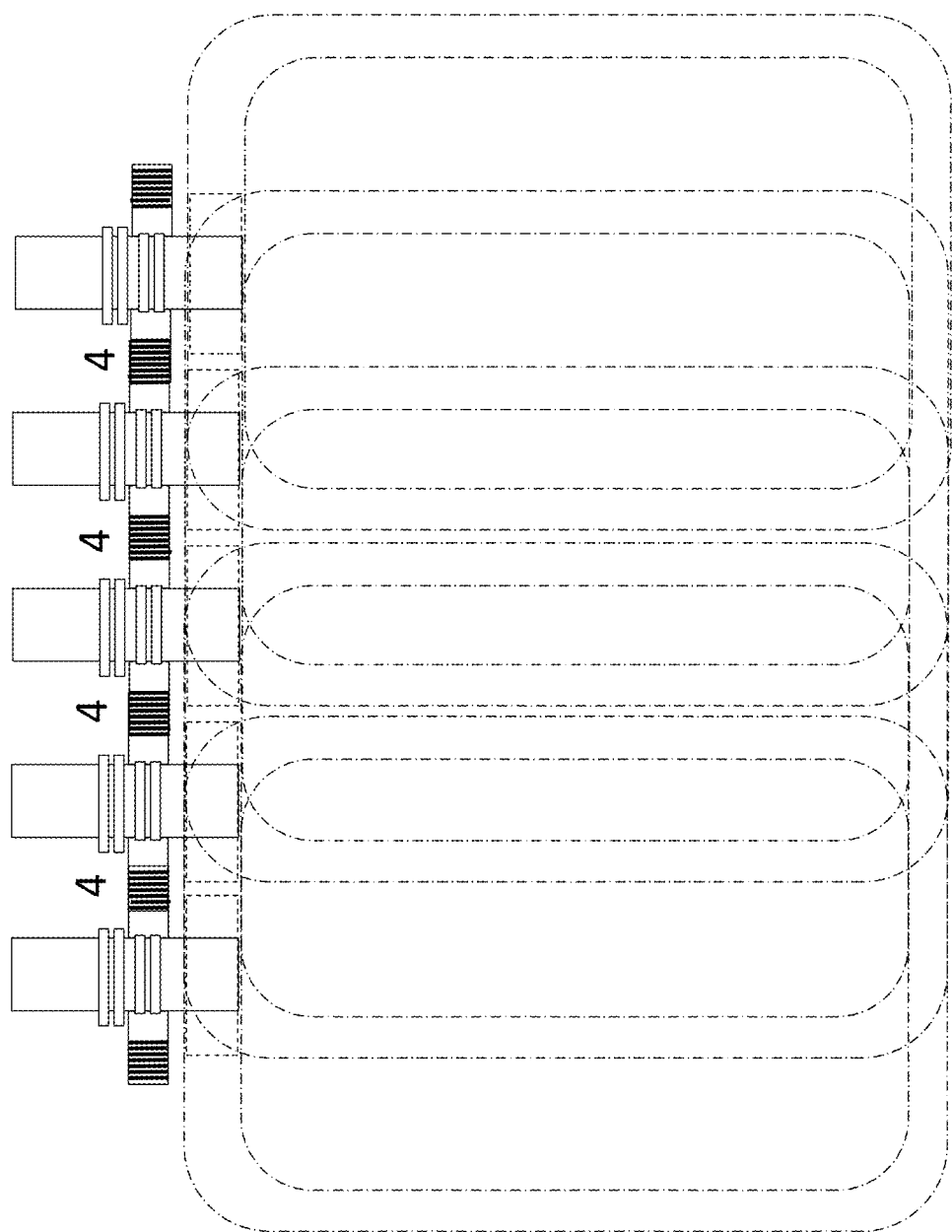

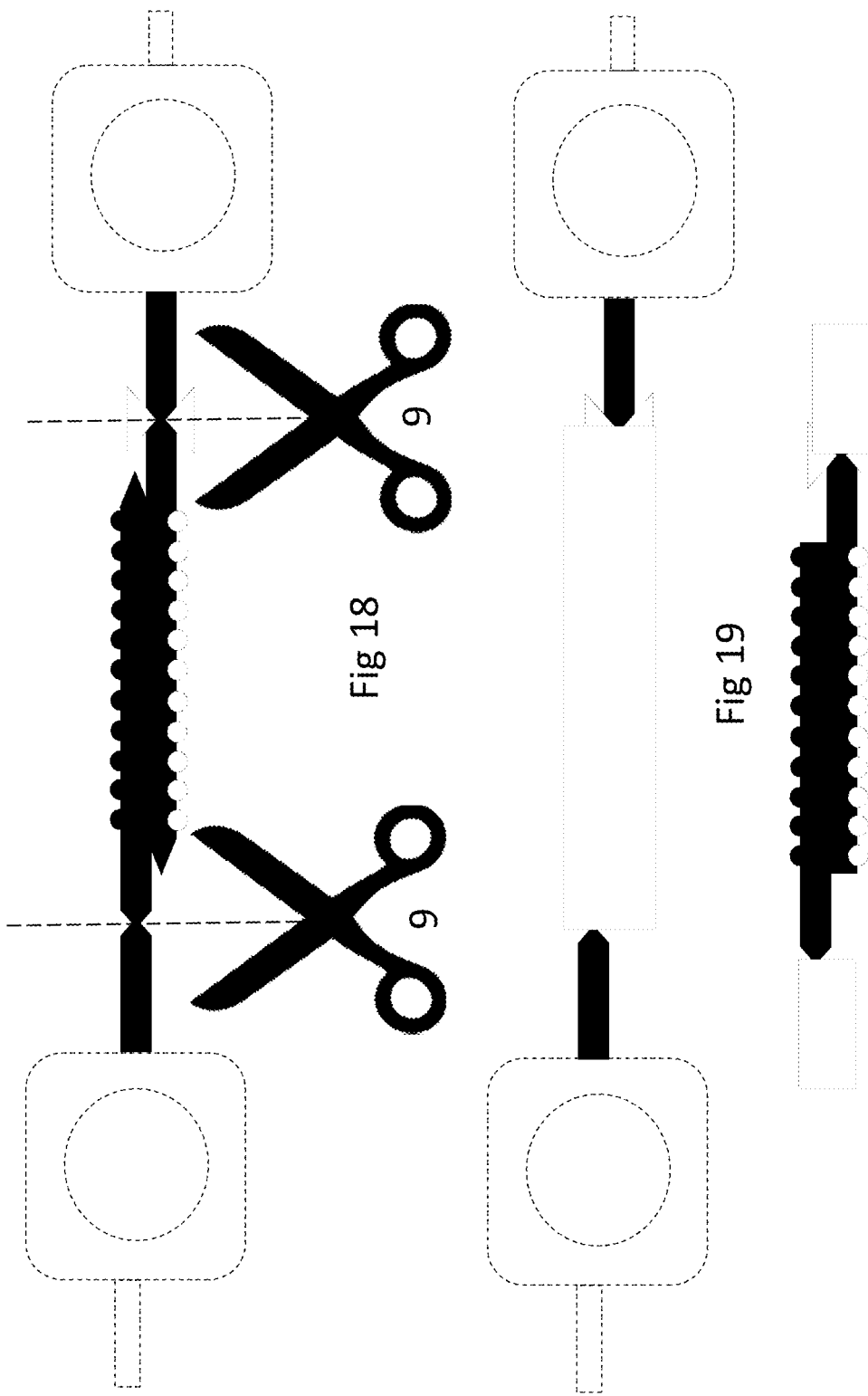

CONNECTED SPOUTS OF CONTAINERS AND RELATED METHODS

TECHNICAL FIELD

This invention relates to a method of physically connecting packaging, in particular spouts of flexible pouches, and providing a means to assist and improve storage, transport and handling of the pouches through a supply chain to the place where they are to be filled with product.

BACKGROUND TO THE INVENTION

Preformed spouted flexible pouches are commonly used as containers for the packaging of beverages and other liquid products. Current practice is to manufacture them as individual containers and supply them in boxes or cartons to the place where they are to be filled, usually a packaging facility or factory. The majority of preformed pouches are supplied to customers' loose in boxes. In certain situations they are supplied pre-loaded in batches on lengths of specially adapted carrier rails, with individual pouch spouts being adapted with features to fit inside the rails. In both cases, they are supplied as single and unattached pouches and loading of them into the filling machine is labour intensive and relatively slow. In those instances where pouches are supplied on carrier rails, the rails also need to be recovered in order to be returned to the supplier for reuse.

The spouted pouches may be provided in closed form to ensure that the interior thereof is free from contamination. Typically a removable cap is provided, and the cap opened immediately prior to filling, and re-closed immediately thereafter. Filling may take place in a filling or vending machine or the like.

STATEMENT OF THE INVENTION

According to the invention there is provided a rigid moulded spout for flexible containers, the spout having a mouth, at least one projection for attachment of a pouch thereto and oppositely protruding tabs adapted to be adhered to respective tabs of neighbouring spouts of the same type to form long ribbons of spouts, wherein said mouth is arranged above the transverse axis of said tabs, and wherein said at least one projection for attachment of a pouch is arranged below said transverse axis of said tabs. The mouth is positioned at the upper end of the spout. A channel extends from said mouth to the lower end of the spout. When the spout has been attached to a spout, the lower end of the channel leads inside the pouch and communicates with the pouch. The channel extends in an axial direction, wherein said transverse axis extends perpendicular to said axial direction and through the middle (in relation to said axial direction) of the tabs.

Furthermore, according to the invention there is provided a method of connecting moulded spouts of flexible containers, the method including the steps of providing oppositely directed tabs on each spout, said tabs extending a direction orthogonal to the axis of the mouth or channel of the spout; and adhering each tab to the tab of a neighbouring spout, so as to form a ribbon.

Finally, according to the invention there is provided a connection arrangement comprising at least two rigid moulded spouts for flexible containers, each spout having oppositely protruding tabs, wherein at least one of the tabs of one of said spouts is adhered to one of the tabs of one neighbouring spout to form long ribbons of spouts. The spouts are all of the same type and may all have the features described in this application.

This invention provides for a form of packaging that improves the efficiency of the transport and loading of spouted flexible pouches over current industry practices. The invention provides for a large number of spouted flexible pouches to be joined into long chains during manufacture, making it possible to transport them in bulk and handle them more easily during loading into a filling machine. As each pouch on the chain enters the filling machine, the adjacently connected pouch is automatically pulled into a point where it can enter the filling machine, thus reducing the amount of time and labour required to manually transport and load the pouches to and through the filling machine. Pouches are filled sequentially, and after filling the leading pouch is separated from its neighbour so as to constitute an independent filled container.

Advantages

Supplying preformed spouted pouches in a form of connected ribbon or chain improves the packing process and makes transportation to the place where they are to be filled more efficient. It also simplifies the process of loading into the filling machine and reduces the amount of labour time required to do this.

Preferably, the spouts of an individual pouch are connected to another by protruding tabs oppositely opposed longitudinally from the body of the spout. The tabs of each pouch are bonded to tabs on adjacent pouches, thus being formed into a chain. Preferably, the tabs are adapted to have surfaces that enable them to fit together with the adjacent spout.

Preferably, the spout and protruding tab to be made from a material that can be heat welded or bonded to each other. Preferably in one form of the invention, the protruding tabs incorporate a structural feature enabling the spouts to flex laterally relative to each other. The spouts are preferably plastic mouldings. The tabs may be of uniform thickness for example 0.2 mm.

Preferably the tabs protruding from the body of the spout are positioned perpendicularly and centrally to slotted features on the spout that are used to guide the spout through the filling machine. Preferably in one form of the invention, a lower oval shaped feature of the base of the spout that attaches the spout to the flexible film of the pouch body is aligned at an offset angle to the direction of the protruding tabs enabling the flexible film part of each pouch to overlap with the flexible film part of adjacent pouches in the chain without cause to create interference with one another.

Drawings An example of the invention will now be described by referring to the accompanying drawings:

FIG. 1 shows a side view of a single spout with side tabs

Figure 16:
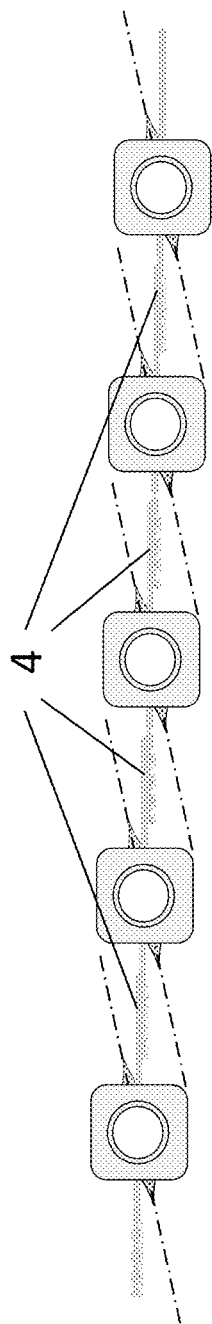
Figure 17:
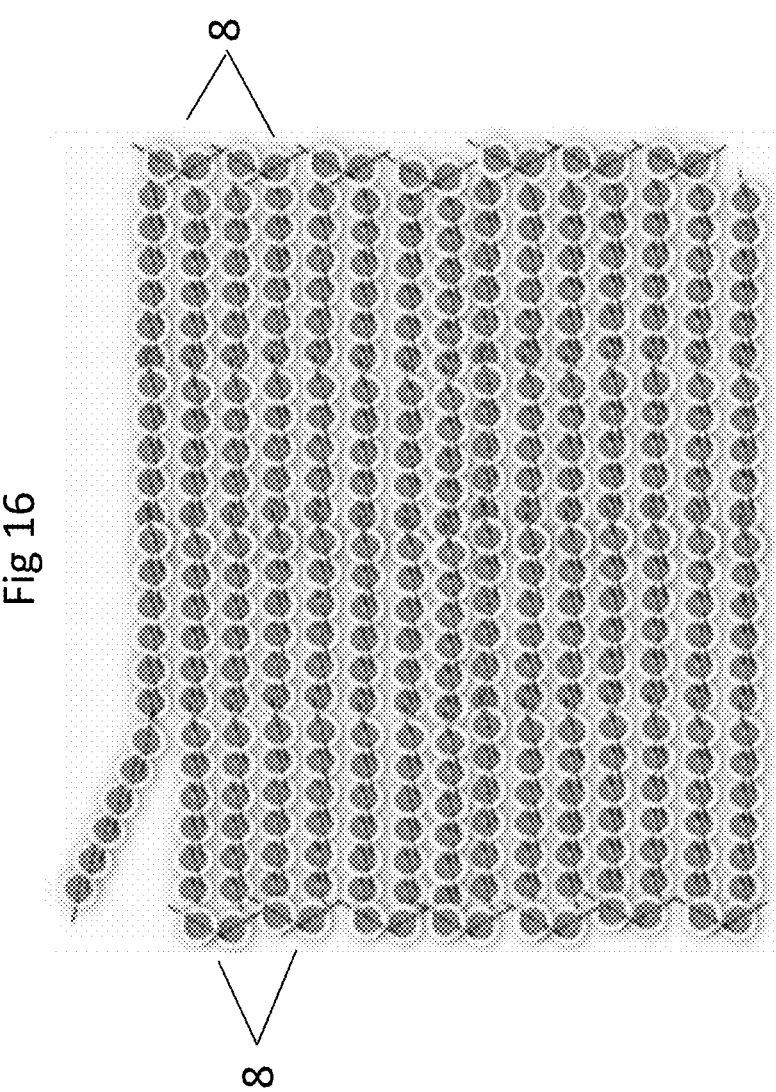
Figure 20:
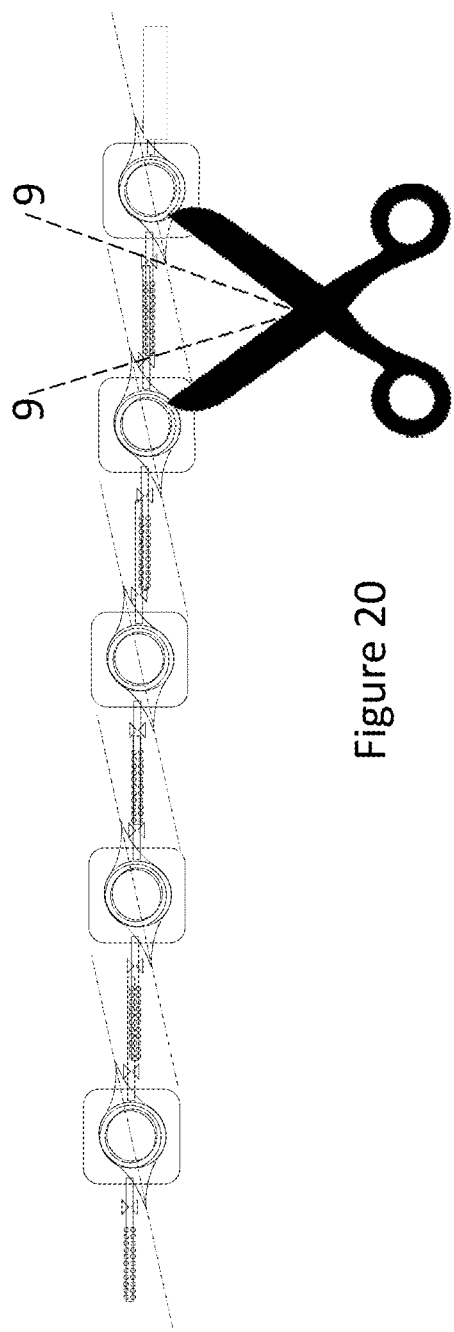
Figure 21:
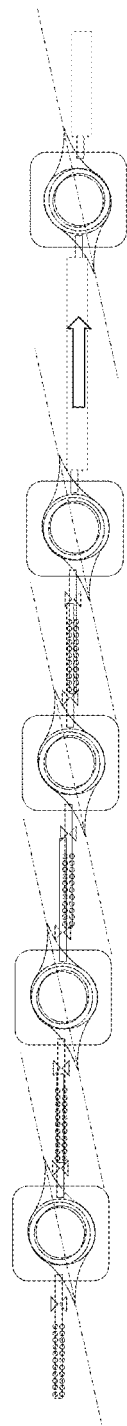

FIG. 2 shows a side view of a single spout with side tabs attached into the upper edge of a flexible pouch FIG. 3 shows an oblique view of a single spout with side tabs attached into the upper edge of a flexible pouch FIG. 4 shows a side view of a spout with side tabs FIG. 5 shows and end on view of a spout with side tabs FIG. 6 shows a side view of a spout with side tabs FIG. 7 shows and end on view of a spout with side tabs FIG. 8 shows a spout with side tabs from underneath FIG. 9 shows a spout with side tabs from above FIG. 10 shows a single spout with tabs adjacent to a chain of connected spouts with tabs from underneath FIG. 11 shows a chain of connected spouts with side tabs FIG. 12 shows detail of two adjacent side tabs FIG. 13 shows detail of two connected side tabs FIG. 14 shows a chain of connected uncapped spouts with side tabs attached into the upper edges of flexible pouches FIG. 15 shows a chain of connected capped spouts with side tabs attached into the upper edges of flexible pouches FIG. 16 shows a chain of connected spouts with side tabs from above FIG. 17 shows a layered chain of connected spouts with side tabs FIG. 18 shows the position of cut to remove a spouted pouch from a connected chain FIG. 19 shows a separated pair of spouted pouches with the connected tabs removed FIG. 20 shows the position of cut to remove a spouted pouch from a connected chain FIG. 21 shows a separated spouted pouch with the connecting side tabs removed.

DETAILED DESCRIPTION

According to a first aspect of the invention there is provided a form of package comprising:

a flexible container (1) for fluid or viscous material and a relatively rigid spouted closure (2), the closure comprising a neck opening which may be adapted to receive a cap (6) for the neck, said closure further including oppositely directed coupling protrusions or tabs (3) thereon, whereby several such packages may be linked together (4) by welding or bonding of the protrusions to form a ribbon, the surfaces of the coupling protrusions being adapted to have ribbed features (5) enabling them to interlock when overlapped with adjacent protrusions of similar closures and further be made from a material that is compliant to heat welding or other means of bonding to each other in order to form a ribbon or chain of pouches, the resulting ribbon or chain being able to provide resistance to movement force along its length.

In one aspect of the invention, the coupling protrusions have a feature (7) which includes a section being thinner in material thickness and may be a recessed channel or groove that runs from the top edge to the lower edge on both surfaces of the coupling, which performs in a way to allow the protrusion to move orthogonally to the upright closure, allowing a chain of packaging to fold back onto itself and to form into layers (8).

In one aspect of the invention, the orientation of the pointed oval feature (11) of the closure that attaches to the flexible part of the packaging is offset at an angle to the tab for the purposes of permitting the flexible part of each container to overlap with the same part of an adjacent container in the chain (12).

In one aspect of the invention, the closures can be separable from the ribbon on application of a cutting action to the coupling protrusions applied by a blade or guillotine across the coupling protrusions and in one aspect of the invention, the cutting action (9) applied along the length of the features (7) that are thinner in material thickness.

In one aspect of the invention, the coupling protrusion is positioned centrally to a rail guide feature (10) on the closure, said guide being designed to support the packaging along a rail through a filling machine and being centrally positioned, thereby ensuring forces between adjacent closures act centrally along the rail and the rail guide and thereby reducing any twist or misalignment of the chain that could lead to an increase in friction between the rail and the rail guide possibly resulting in the chain becoming jammed.

In one aspect of the invention, the packaging is supplied with caps pre-fitted to the closures (6), and under these conditions the cap would be removed prior to filling through the open spout of the closure before being re-fitted.

A plurality of the packages may be provided as linked together to form a ribbon and the ribbon formed as a reel. A plurality of the packages may also be provided to form a layered alternating ribbon enabling it to be packed tightly into a box or carton (8).

The invention claimed is:

1. A rigid moulded spout for flexible containers, the spout having a mouth, at least one projection for attachment of a pouch thereto and oppositely protruding tabs adapted to be adhered to respective tabs of neighbouring spouts of the same type to form long ribbons of spouts, wherein said mouth is arranged above a transverse axis of said tabs, and wherein said at least one projection for attachment of a pouch is arranged below said transverse axis of said tabs.

2. The spout according to claim 1, wherein said tabs are flat and substantially planar.

3. The spout according to claim 1, wherein said tabs are substantially rectangular.

4. The spout according to claim 1, wherein said tabs are identical.

5. The spout according to claim 1, wherein each of said tabs has increased flexibility inboard of an adhering portion thereof.

6. The spout according to claim 5, wherein said tabs include a thinned region to impart said flexibility.

7. The spout according to claim 6, wherein said thinned region comprises a groove.

8. The spout according to claim 5, wherein said increased flexibility is in a direction orthogonal to an axis of an opening defined by said spout.

9. The spout according to claim 1, wherein said projection for attachment of a pouch is an annular projection.

10. The spout according to claim 9, wherein said projection comprises an oval, having a long axis that is non-aligned with a direction of said tabs.

11. The spout according to claim 10, wherein said oval comprises pointed apices on the long axis.

12. The spout according to claim 1, wherein the spout further comprises radial projections orthogonal to an extending direction of said tabs, and wherein said radial projections are adapted to support said spout on either side upon a rail.

13. The spout according to claim 1, wherein each tab has an adhering side and a non-adhering side, and wherein the adhering side of each tab is provided with ribs.

14. The spout according to claim 13, wherein the non-adhering side is of each tab is provided with ribs.

15. The spout according to claim 14, wherein the ribs provided on the adhering side of each tab are interengageable with ribs provided on tabs to be adhered thereto in use.

16. The spout according to claim 1, wherein the tabs are adapted to be adhered by one of ultrasonic welding, thermal welding, solvent welding and adhesive.

* * * * *